United States Patent
An et al.

(10) Patent No.: US 8,036,631 B2
(45) Date of Patent: Oct. 11, 2011

(54) METHOD FOR AUTOMATICALLY CONNECTING VIDEO COMMUNICATION BETWEEN MOBILE STATIONS DURING AN EMERGENCY

(75) Inventors: Dae Won An, Gumi-si (KR); Min Hong Park, Busan (KR); Ho Kwon Song, Gumi-si (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 1147 days.

(21) Appl. No.: 11/820,989

(22) Filed: Jun. 20, 2007

(65) Prior Publication Data

US 2008/0064362 A1    Mar. 13, 2008

(30) Foreign Application Priority Data

Sep. 8, 2006    (KR) .................. 10-2006-0087067

(51) Int. Cl.
  *H04N 7/14* (2006.01)
  *H04N 7/15* (2006.01)
  *H04M 11/04* (2006.01)
(52) U.S. Cl. ............. 455/404.1; 348/14.02; 348/552; 348/14.01
(58) Field of Classification Search .......... 455/404.1, 455/521; 348/14.01–14.16, 552
  See application file for complete search history.

(56) References Cited

U.S. PATENT DOCUMENTS

| | | | |
|---|---|---|---|
| 6,380,990 B1 * | 4/2002 | Bessel | 348/806 |
| 6,775,356 B2 * | 8/2004 | Salvucci et al. | 379/49 |
| 7,058,409 B2 * | 6/2006 | Hanninen et al. | 455/456.1 |
| 7,224,999 B1 * | 5/2007 | Yamaguchi | 455/566 |
| 7,245,704 B2 * | 7/2007 | Binning | 379/45 |
| 7,257,387 B2 * | 8/2007 | Laliberte | 455/404.1 |
| 7,424,310 B1 * | 9/2008 | Barbeau | 455/556.1 |
| 7,844,296 B2 * | 11/2010 | Yuki | 455/556.1 |
| 2002/0137528 A1 * | 9/2002 | Fraccaroli | 455/457 |
| 2004/0105529 A1 * | 6/2004 | Salvucci et al. | 379/45 |
| 2004/0179092 A1 * | 9/2004 | LaPoint | 348/14.08 |

(Continued)

FOREIGN PATENT DOCUMENTS

KR    2000-77258    12/2000

(Continued)

OTHER PUBLICATIONS

Machine Translation of admitted prior art document Saburi (10-2000-0025577) published Dec. 26, 2000.*

*Primary Examiner* — Matthew Sams
(74) *Attorney, Agent, or Firm* — Cha & Reiter, LLC

(57) ABSTRACT

Disclosed is a method for automatically connecting a video communication between mobile stations in an emergency, wherein a mobile station in an emergency calls another mobile station and, even if there is no response from it, the video connection can be made automatically. The method includes the steps of selecting an automatic emergency response mode so that a first mobile station in an emergency calls a second mobile station and automatically connects to it; making an emergency call from the first mobile station, which is in the automatic emergency response mode, to the second mobile station; and automatically connecting the video communication between the first and second mobile stations, when the first mobile station makes a call even if the second mobile station does not respond to it.

8 Claims, 6 Drawing Sheets

U.S. PATENT DOCUMENTS

| | | | |
|---|---|---|---|
| 2005/0135570 A1* | 6/2005 | Binning | 379/45 |
| 2005/0169439 A1* | 8/2005 | Binning | 379/45 |
| 2005/0197112 A1* | 9/2005 | Yang et al. | 455/418 |
| 2005/0277421 A1* | 12/2005 | Ng | 455/445 |
| 2006/0133582 A1* | 6/2006 | McCulloch | 379/45 |
| 2007/0072581 A1* | 3/2007 | Aerrabotu | 455/404.1 |

FOREIGN PATENT DOCUMENTS

| | | |
|---|---|---|
| KR | 2002-69544 | 9/2002 |
| KR | 2006-53578 | 5/2006 |
| KR | 2006-96602 | 9/2006 |
| KR | 2006-98766 | 9/2006 |

* cited by examiner

METHOD FOR AUTOMATICALLY CONNECTING VIDEO COMMUNICATION BETWEEN MOBILE STATIONS DURING AN EMERGENCY

CLAIMS OF PRIORITY

This application claims priority to an application entitled "METHOD FOR AUTOMATICALLY CONNECTING VIDEO COMMUNICATION BETWEEN MOBILE STATIONS IN AN EMERGENCY," filed in the Korean Intellectual Property Office on Sep. 8, 2006 and assigned Serial No. 2006-0087067, the contents of which are incorporated herein by reference.

BACKGROUND OF THE INVENTION

1. Field of the Invention

The present invention relates generally to a method for establishing a video communication between mobile stations, and more particularly, to a method of automatically establishing a video communication between mobile stations during an emergency, wherein a first H.324M mobile station in distress calls a second H.324M mobile station and automatically establishes a video communication even if there is no response from the second mobile station.

2. Description of the Related Art

As generally known in the art, an emergency occurs in the course of a many disasters, e.g. a robber or medical emergency. In such a case, it is customary to make an emergency call or operate an emergency bell/alarm to contact the police or an emergency center (e.g. 911) for help.

Recently, such an emergency contact has become easier, i.e. it can be made at any place and time, as mobile stations are widely used. In most cases, a call is made for an emergency contact via activating a pre-stored emergency number, an SMS, or speed dialing. However, if the called party does not respond, it follows that undesirable outcome may occur. Furthermore, even if the called party responds, the calling party may be in panic situation to calmly communicate with the operator.

Accordingly, there is a need for improving the handling of an emergency call.

SUMMARY OF THE INVENTION

The present invention has been made in view of the above problems and provides additional advantages, by providing a method for automatically connecting video communications between mobile stations in an emergency, wherein a mobile station calls another mobile station and automatically establishes video communications.

One aspect of the present invention is to provide a method for automatically connecting a video communication between mobile stations in an emergency, wherein a call from one mobile station is followed by automatic video communications with another mobile station even when there is no response by the called party.

Another aspect of the present invention is to provide a method for automatically connecting a video communication between mobile stations in an emergency, wherein an H.324M mobile station in distress calls a predetermined mobile station and automatically connects to it.

In accordance with an exemplary embodiment of the present invention, there is provided a method for automatically connecting a video communication between mobile stations in an emergency. The method includes the steps of selecting an automatic emergency response mode so that a first mobile station in an emergency calls a second mobile station and automatically establishes a connection; making an emergency call from the first mobile station, which is in the automatic emergency response mode, to the second mobile station; and automatically connecting a video communication between the first and second mobile stations, when the first mobile station makes a call, even when the second mobile station does not respond to it.

The method further includes a step of deselecting or maintaining the automatic emergency response mode as desired after the step of automatically establishing the video communication.

The method further includes a step of making an emergency call from the first mobile station to the second mobile station, storing the call number used to make the emergency call, and automatically connecting the first and second mobile stations to each other when the second mobile station makes a call, regardless of the response.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Figure 1:
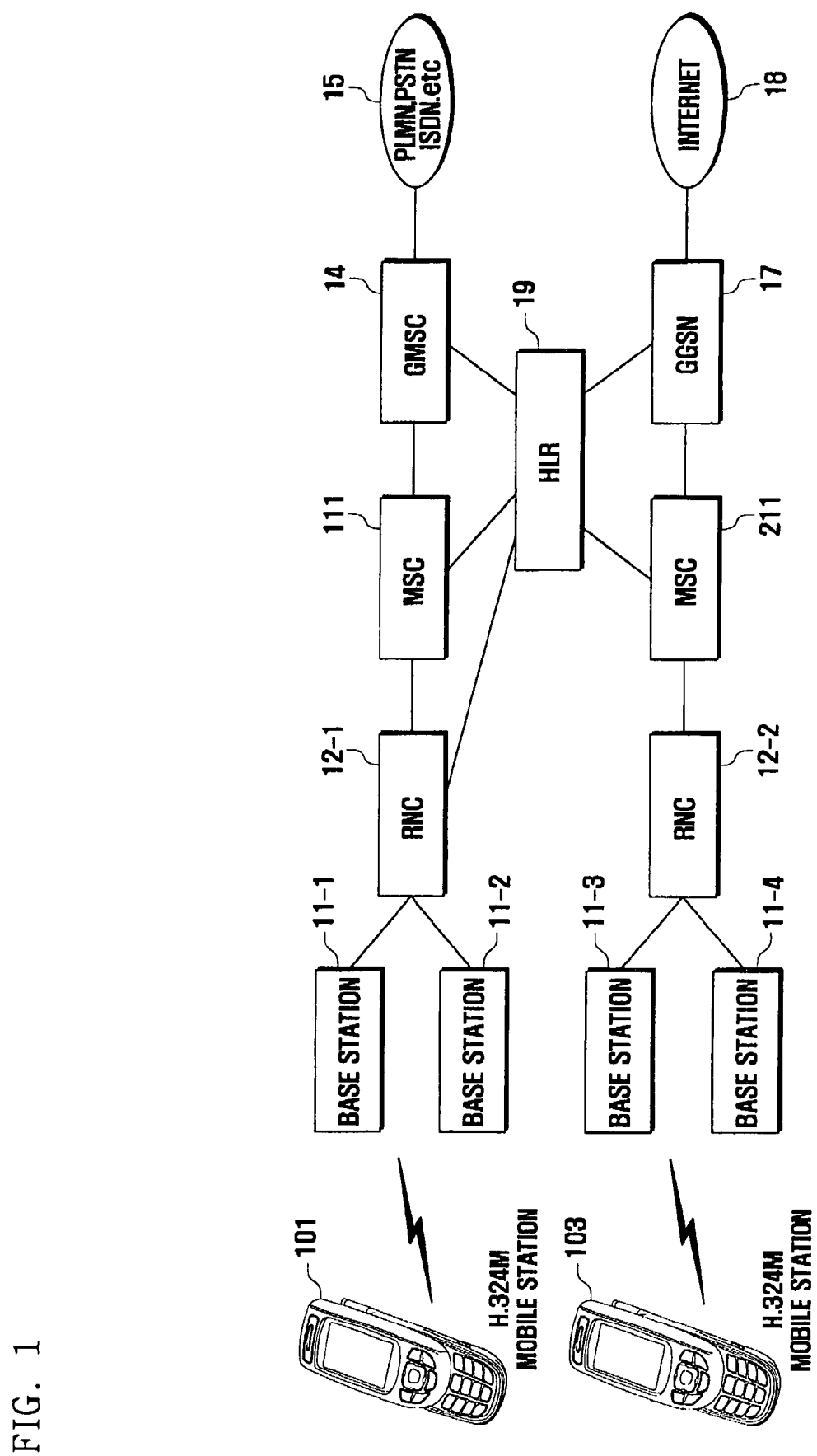
FIG. 1 shows H.324M mobile stations and a WCDMA core network system for providing a video communication.

Hereinafter, exemplary embodiments of the present invention are described in detail with reference to the accompanying drawings. The same reference symbols identify the same or corresponding elements in the drawings. For the purposes of clarity and simplicity, detailed descriptions of constructions or processes known in the art may be omitted to avoid obscuring the invention in unnecessary detail.

In order to provide a video communication service in mobile communication environments, the bandwidth must be larger, at least 64 Kbps than the voice bandwidth (12.2 Kbps), and the mobile stations must be able to encode at least five frames of images per second. Such requirements have not been satisfied until $3^{rd}$ generation mobile communication networks have recently introduced. The $3^{rd}$ generation mobile communication networks are technically classified into asynchronous-type networks based on a wideband CDMA (hereinafter, referred to as WCDMA) and synchronous-type networks based on a CDMA 2000. The protocol regarding the video communication service depends on the network type.

Particularly, WCDMA-type networks use a protocol based on "3G.324M," which is standardized by 3GPP (3$^{rd}$ Generation Partnership Project). However, the 3G.324M-based protocol used in WCDMA-type networks cannot enable real-time video communication in an emergency. In addition, when an emergency call is made, the calling party may be unable to talk or not respond in any manner depending on the situation. Therefore, the teachings of the present invention provide means for establishing an emergency call in such a situation, as explained hereinafter.

A method for automatically establishing a video communication in an emergency according to the present invention will be described with regard to three scenarios for illustrative purposes. However, it should be noted other scenarios may be applicable according to the teachings of the present invention.

In the first case, a mobile station is in an automatic emergency response mode, and in an emergency, the user of a mobile station automatically connects a video communication with a remote mobile station, even if there is no response by the remote mobile station.

In the second case, a mobile station is in an automatic emergency response mode and, when its user is in an emergency and when a remote mobile station calls it, the automatic emergency response mode enables a video communication between them, even if there is no response by the called user.

In the third case, a mobile station is in an automatic emergency response mode and, when its user is in an emergency, calls a mobile station of a predetermined person and stores the telephone number. When the mobile station corresponding to the stored telephone number calls back, a video communication is automatically established between them.

Note that the call in the above scenarios can also be made using an SMS or MMS, and the corresponding telephone number may be stored.

In general, the user is the owner of an H.324M mobile station in an emergency, and any other mobile station may be the called party or user or who calls the user in an emergency. The predetermined person may be one responsible for taking care of the user, such as a parent or other member of the family.

In the present invention, in order to automatically connect a video communication between H.324M mobile stations in an emergency even if the receiving side does not respond, a corresponding setup must be made in advance. If no setup has been made, one can be made during operation. When a mobile station requests such a setup, the MSC (Mobile Services Switching Center) stores the number of the corresponding H.324M mobile station for an emergency video communication. When the counterpart of the corresponding H.324M mobile station makes an emergency call, they are connected to each other based on the setup under the control of the MSC, regardless of whether or not there is a response.

FIG. 1 illustrates a core network system for realizing a video communication according to an embodiment of the present invention. Referring to FIG. 1, base stations 11-1, 11-2, 11-3, and 11-4 enable radio communications between RNCs (Radio Network Controllers) 12-1 and 12-2 and H.324M mobile stations 101 and 103.

The RNCs 12-1 and 12-2 manage radio resources and handle connection with the CN (Core Network).

MSCs (Mobile Services Switching Centers) 111 and 211 are adapted to provide a circuit-switched service. In addition, the MSCs 111 and 211 track mobile telephone subscribers so that, even if their locations vary, the mobile telephone service is provided without interruptions (i.e. communication channel switching function).

According to the present invention, in order to automatically connect video communication between the H.324M mobile stations 101 and 103 in an emergency even if the receiving side does not respond, a corresponding setup must be made in advance. Such a setup is made by the MSCs 111 and 211. When the counterpart of the corresponding H.324M mobile station makes an emergency call, the MSCs 111 and 211 connect the mobile stations to each other based on the setup regardless of whether or not there is a response.

A GMSC (Gateway Mobile Services Switching Center) 14 connects the circuit-switched service with an external network 15, such as a PLMN, PSTN, or ISDN.

A GGSN (Gateway GPRS Support Node) 17 interlinks the network with an external network 18, such as Internet.

An MLR (Home Location Register) 19 acts as a database within the network so as to manage subscriber information, location information, etc., which are necessary to provide the H.324M mobile stations 101 and 103 with services within the network. The HLR 19 plays a role similar to the GMSC 14, except that it provides a packet-switched service.

Figure 2:
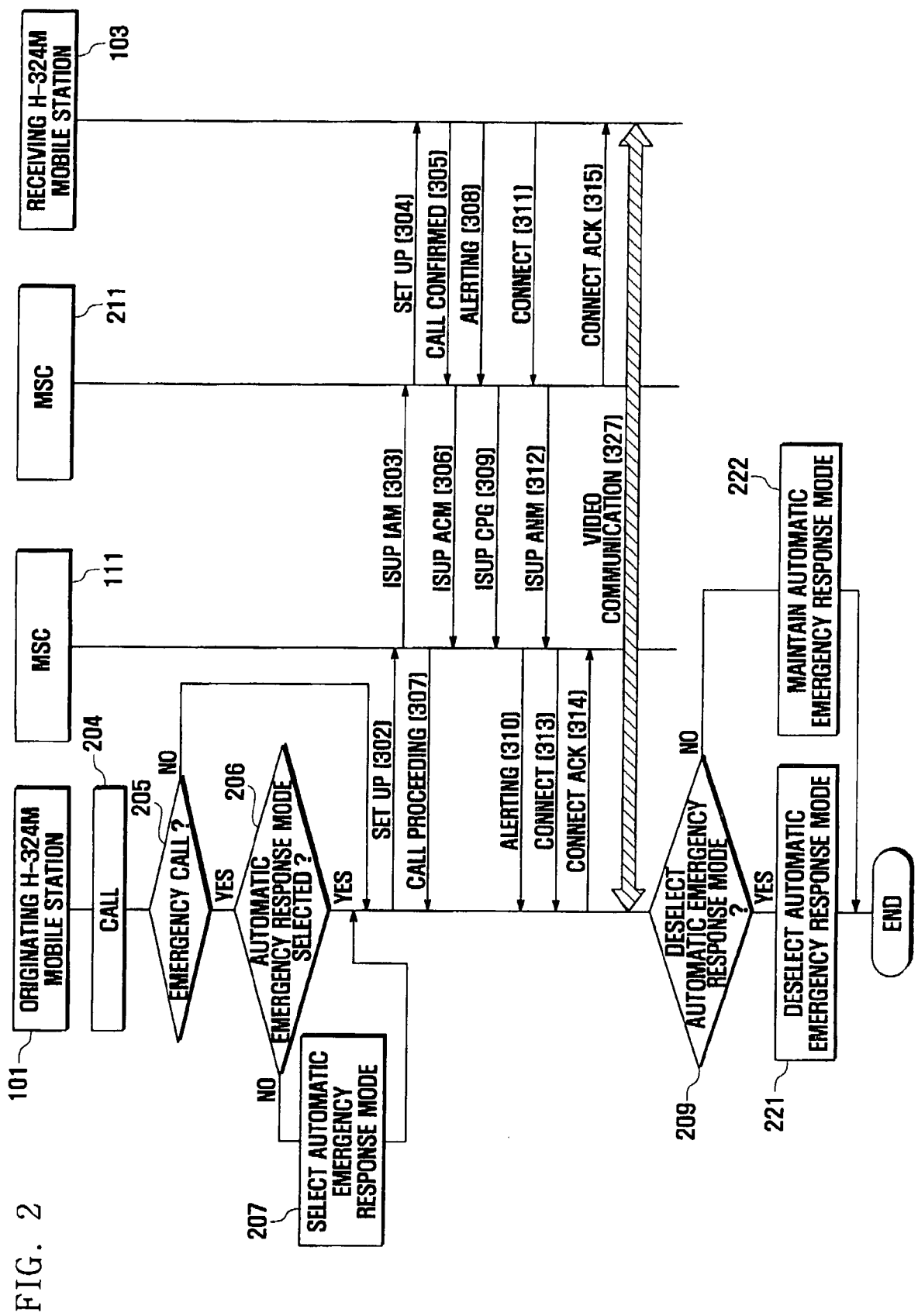
FIG. 2 shows a procedure of how an H.324M mobile station, which is in an emergency, calls another H.324M mobile station and automatically establishes a connection according an embodiment of the present invention.

FIG. 2 shows an operation process of how an H.324M mobile station, which is in an emergency, calls another H.324M mobile station and automatically connects to it according to an embodiment of the present invention.

Referring to FIG. 2, the H.324M mobile station 101 corresponds to the originating caller in an emergency, and the H.324M mobile station 103 corresponds to the receiving party. Hence, the MSCs 111 and 211 correspond to the originating and receiving sides, respectively.

When the user of the H.324M mobile station 101 is in an emergency (e.g. disaster), the H.324M mobile station 101 makes a call in step 204. Then, it is checked in step 205 whether or not the call is an emergency call. If it is confirmed in step 205 that the call is not an emergency call, the H.324M mobile station 101 requests a setup in step 302 and conducts a normal call process with the H.324M mobile station 103 under the control of the originating and receiving MSCs 111 and 211. If it is confirmed in step 205 that the call is an emergency call, the H.324M mobile station 101 checks if an automatic emergency response mode has been selected in step 206. If it is confirmed in step 206 that the automatic emergency response mode has not been selected, the automatic emergency response mode is selected in step 207. If it is confirmed in step 206 that the automatic emergency response has been selected, a call process is conducted. Particularly, when the originating H.324M mobile station 101 requests that the originating MSC 111 make a setup in step 302, a call proceeding is conducted with regard to the originating MSC 111 in step 307.

The originating MSC 111 transmits an ISUP IAM to the receiving MSC 211 in step 303 and requests that the receiving M.324M mobile station 103 makes a setup in step 304. The receiving H.324M mobile station 103 provides the receiving MSC 211 with a call confirmation signal in step 305, and transmits an ISUP ACM to the originating MSC 111 in step 306. The receiving H.324M mobile station 103 transmits an alerting signal to the receiving MSC 211 in step 308. Upon receiving the alerting signal, the receiving MSC 211 transmits an ISUP CPE to the originating MSC 111 in step 309, and transmits an alerting signal to the originating H.324M mobile station 101 in step 310. If the receiving H.324M mobile station 103 requests that the receiving MSC 211 make a connection during the alerting process in step 311, the receiving MSC 211 transmits an ISUP ANM to the originating MSC 111 in step 312. The originating MSC 111 requests that the originating H.324M mobile station 101 make a connection in step 313. The originating H.324M mobile station 101 generates a connection acknowledgement signal in response to the connection request in step 314, and provides the receiving H.324M mobile station 103 with the signal in step 315. The originating and receiving H.324M mobile stations 101 and 103 are connected to each other in this manner, so that an emergency video communication is conducted between them in step 327. As such, when the user makes an emergency call to another mobile station, the video communication is automatically connected even if the recipient cannot respond. As a result, it can guarantee a proper emergency aid.

In order to automatically connect the originating H.324M mobile station 101 to the receiving H.324M mobile station 103 in an emergency even if there is no response, the originating and receiving MSCs 111 and 211 control the originating and receiving H.324M mobile stations 101 and 103 so as to conduct a call process for connecting to each other according to whether or not the automatic emergency response mode has been selected in step 207.

The above-mentioned terminologies "ISUP IAM," "ISUP ACM," "ISUP CPG," and "ISUP ANM" are described in detail in "Call Setup Proceeding based on General Mobile to Mobile 3G-324M," which is recommended by "3G TR 23.972 V3.00," thus detailed description thereof will be omitted herein.

The user may deselect the automatic emergency response mode in step 207. This is because some inconveniences may occur when the automatic emergency response mode is continuously selected. If the user makes an input to deselect the automatic emergency response mode in step 209, the mode is deselected in step 221 and, if not, the previous condition is maintained in step 221.

Figure 3:
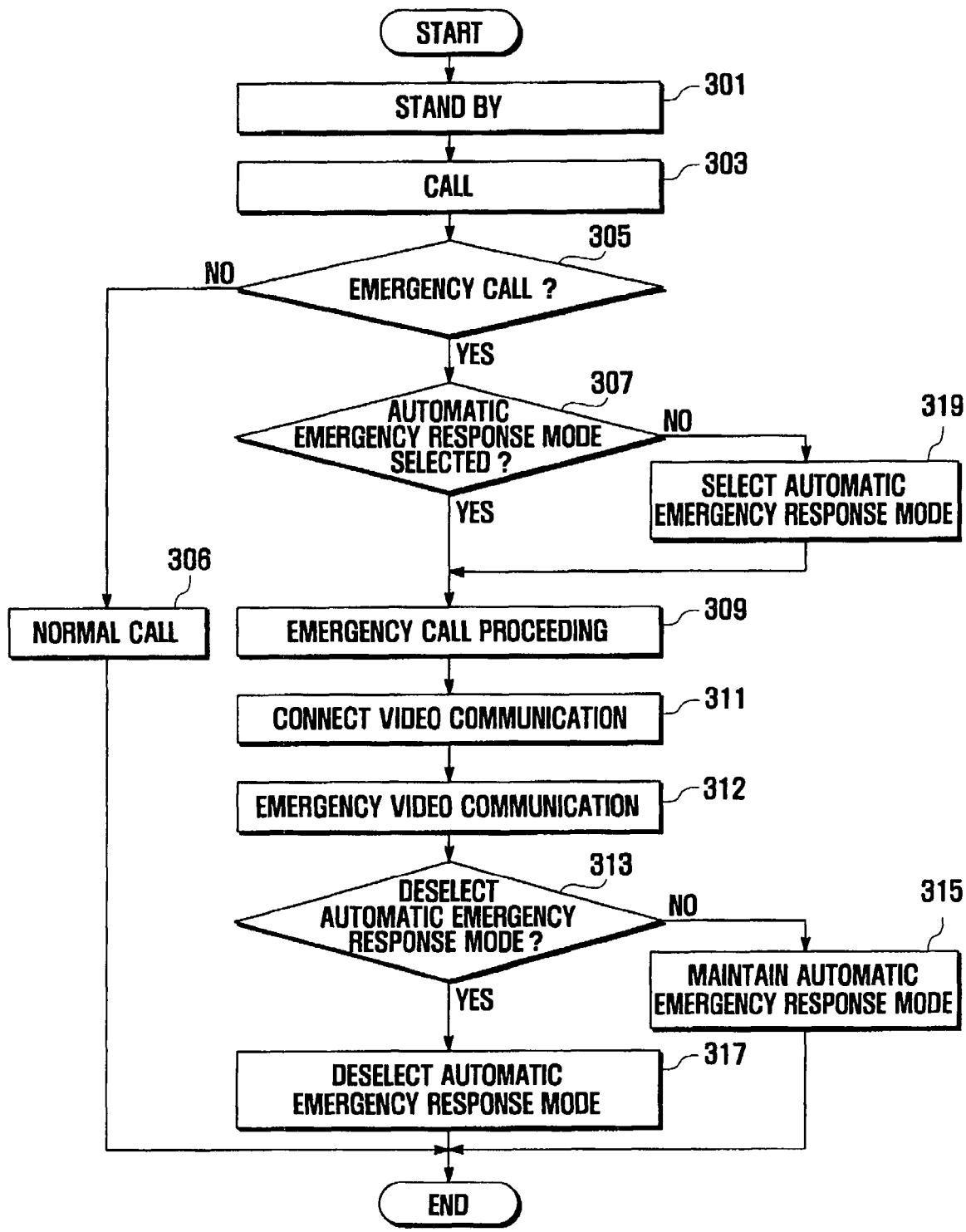
FIG. 3 is a flowchart of the procedure shown in FIG. 2 regarding how an H.324M mobile station in an emergency calls another H.324M mobile station and automatically establishes a connection according an embodiment of the present invention.

FIG. 3 is a flowchart of the operation steps shown in FIG. 2 regarding how an H.324M mobile station in an emergency calls another H.324M mobile station and automatically connects to it according to the present invention.

The originating H.324M mobile station 101 stands by in step 301 and, upon receiving a call in step 303, checks if the call is an emergency call in step 305. If it is confirmed in step 305 that the call is not an emergency call, the originating H.324M mobile station 101 conducts a normal call proceeding. If it is confirmed in step 305 that the call is an emergency call, the originating H.324M mobile station 101 checks in step 307 if an automatic emergency response mode has been selected. If it is confirmed that the automatic emergency response mode has been selected, the originating H.324M mobile station 101 conducts an emergency call proceeding in step 309. If the automatic emergency response mode has not been selected, the mode is selected in step 319, and an emergency call proceeding is conducted in step 309.

The emergency call process in step 309 represents from the setup step 302 to the alerting step 310 shown in FIG. 2. A connection is made in step 311, and a video communication is conducted between the mobile stations in step 312. The video communication connection in step 311 represents from the connection step 331 to the connection acknowledgement step 315 of the receiving H.324M mobile station 103 shown in FIG. 2, and is followed by an emergency video communication in step 312. The automatic emergency response mode is deselected through steps 313, 315, and 317 in a manner similar to steps 209, 221, and 222 shown in FIG. 2.

Figure 4:
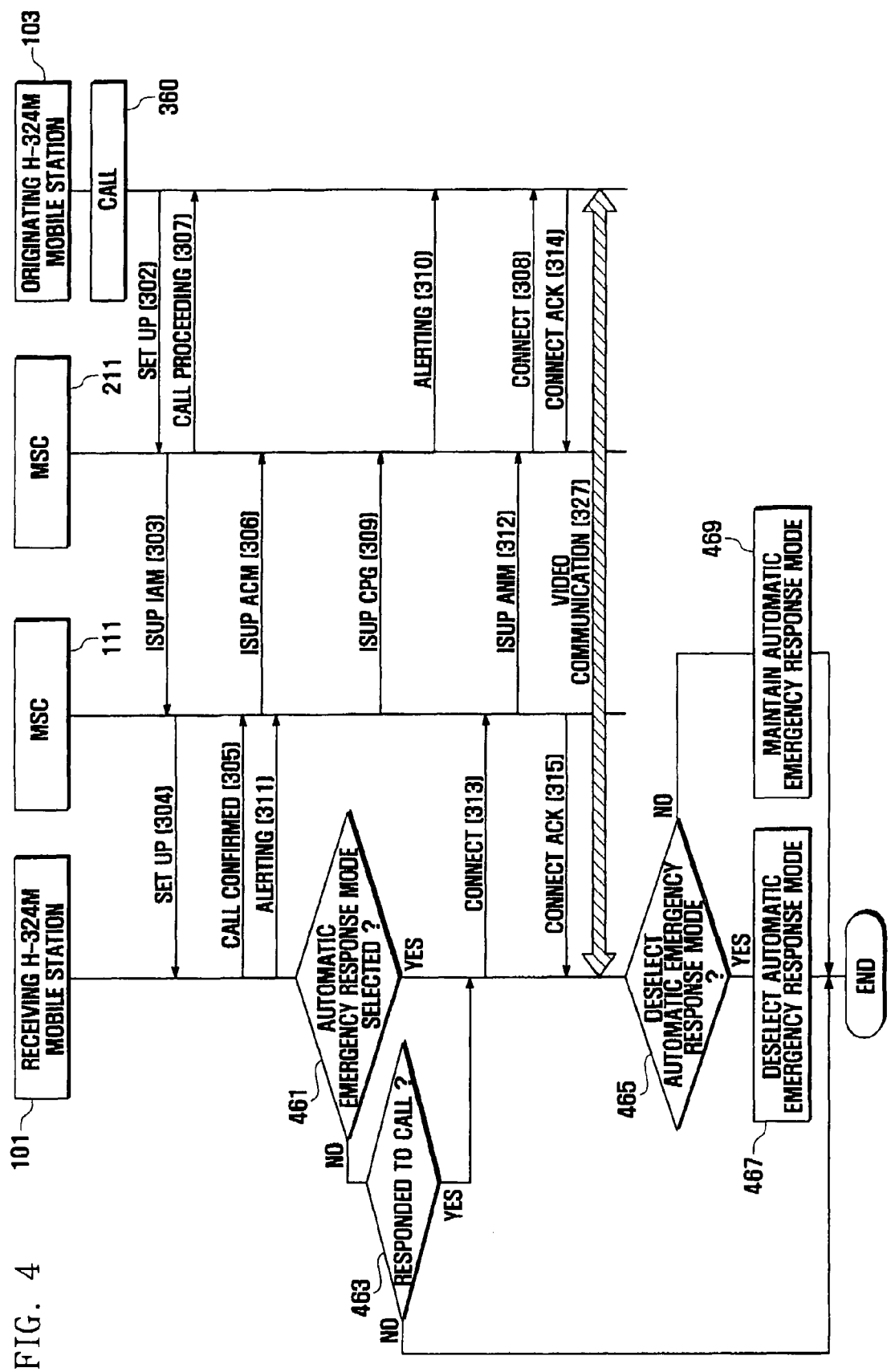
FIG. 4 shows a procedure of how an H.324M mobile station, which is in an automatic emergency response mode, is called by another mobile station and automatically establishes a connection according to another embodiment of the present invention.

FIG. 4 shows a process of how an H.324M mobile station, which is in an automatic emergency response mode, is called by another mobile station and is automatically connected to it according to another embodiment of the present invention.

It is assumed in FIG. 4 that the H.324M mobile station 101 is already in an automatic emergency response mode, and that the other H.324M mobile station 103 makes a call connection. In this regard, the H.324 mobile station 103 corresponds to the originating side (i.e. it makes an emergency call), and the H.324M mobile station 103 corresponds to the receiving side (i.e. it is called).

When the originating H.324M mobile station 103 requests that the originating MSC 211 makes a setup in step 302, a call process is conducted with regard to the originating MSC 211 in step 307 at the same time the request is made. When an ISUP IAM is transmitted to the receiving MSC 111 in step 303 in response to the setup request of the originating MSC 211 in step 302, the receiving MSC 111 requests that the receiving H.324M mobile station 101 makes a setup in step 304. Upon receiving the setup request in step 304, the receiving H.324M mobile station 101 provides the receiving MSC 111 with a call confirmation signal in step 305, and transmits an ISUP ACM to the originating MSC 211 in step 306. The receiving H.324M mobile station 101 transmits an alerting signal to the receiving MSC 111 in step 311. After transmitting the alerting signal, the receiving MSC 211 transmits an ISUP CPE to the originating MSC 111 in step 309, and transmits an alerting signal to the originating H.324M mobile station 103 in step 310. While the call proceeding is conducted, the receiving H.324M mobile station 101 checks if an automatic emergency response mode has been selected in step 461. If no automatic emergency response mode has been selected, it is checked in step 463 if the user of the receiving H.324M mobile station 101 has directly responded. If no automatic emergency response mode has been selected and if the user has responded, a normal call proceeding is conducted.

If it is confirmed in step 461 that the automatic emergency response mode has been selected, a video communication is connected even if there is no response from the user. Particularly, if the automatic emergency response mode has been selected, the receiving H.324M mobile station 101 requests that the receiving HSC 111 make a connection in step 313, and the receiving MSC 111 transmits an ISUP ANM to the originating MSC 211 in step 312. When the originating MSC 211 requests that the originating M.324M mobile station 103 make a connection in step 308, the originating M.324M mobile station 103 generates a connection acknowledgement signal in response to the connection request in step 314. When the receiving H.324M mobile station 101 receives the connection acknowledgement signal in response to the connection request of the originating H.324M mobile station 103 in step 315, an emergency video communication is connected in step 327.

As such, when the H.324M mobile station 101 receives an emergency call from a remote mobile station when it is in an automatic emergency response mode, an emergency video communication is connected between them even if there is no response.

If the user makes an input for deselecting the automatic emergency response mode in step 465, the mode is deselected in step 467. If not, the previous condition is maintained in step 369.

Figure 5A:
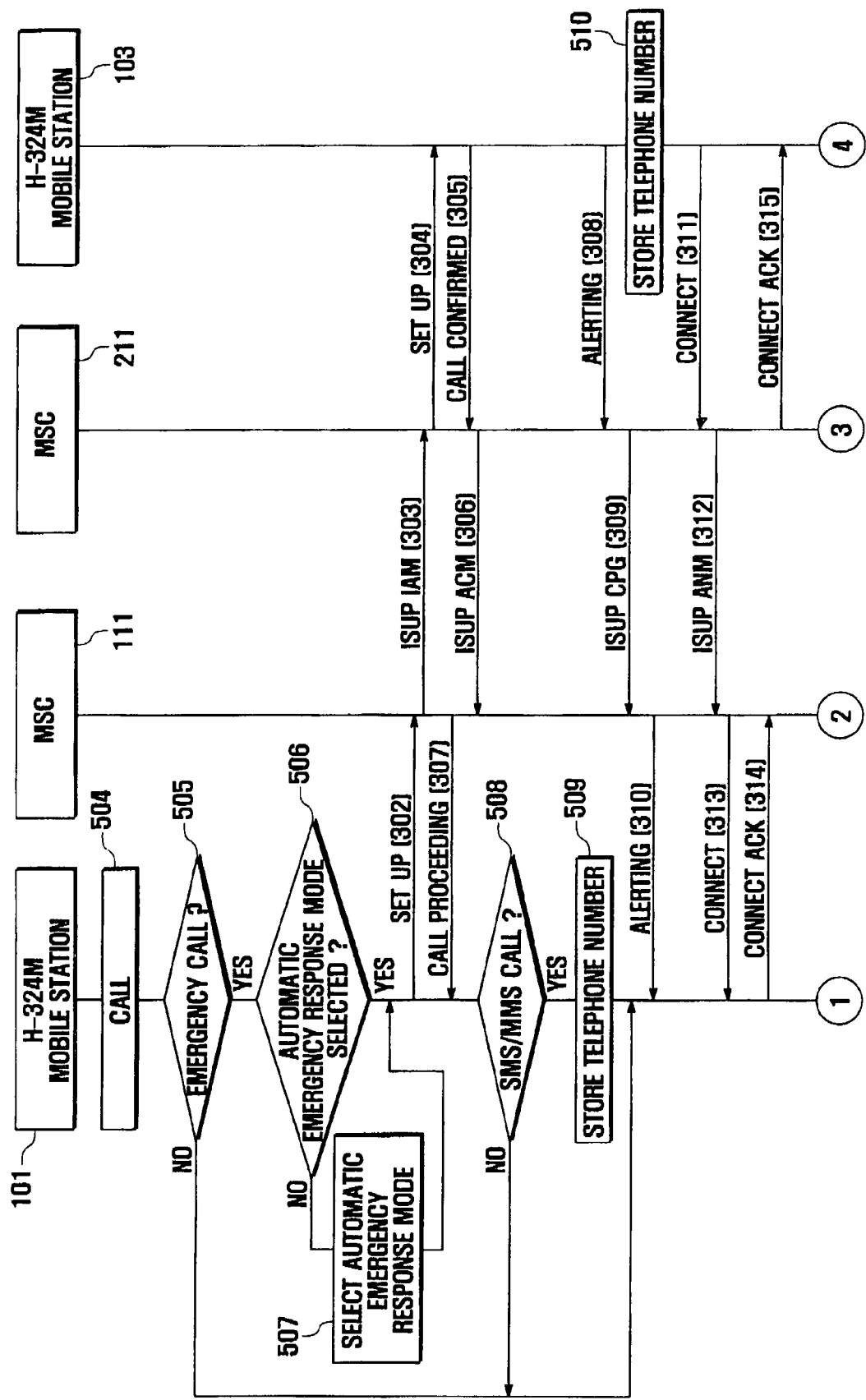
FIG. 5 shows a procedure of how an H.324M mobile station, which is in an emergency, automatically connects to a predetermined H.324M mobile station according to another embodiment of the present invention.
Figure 5B:
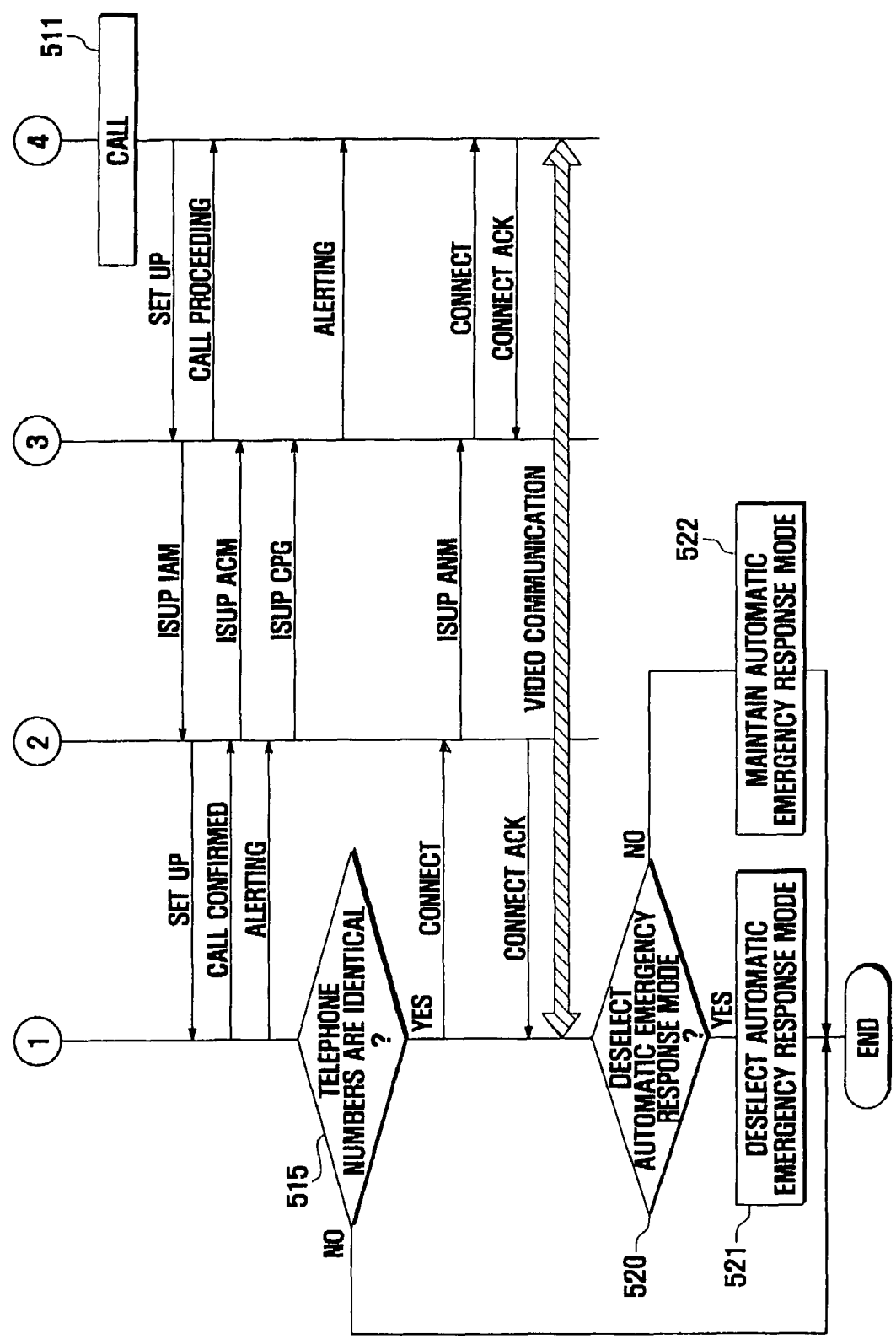

FIG. 5 shows a process of how an H.324M mobile station, which is in an emergency, calls a predetermined H.324M mobile station and automatically connects to it according to another embodiment of the present invention.

Briefly, the H.324M mobile station 101 enters into an automatic emergency response mode in step 507, and calls a predetermined H.324M mobile station 103 by using an SMS or MMS in step 504. In this case, the H.324M mobile station 101 stores the telephone number of the called H.324M mobile station 103 in step 509. The H.324M mobile station 103 also stores the telephone number of the H.324M mobile station 101 which has made the SMS or MMS call in step 510. When the H.324M mobile station 103 calls the H.324M mobile station 101, the stored telephone numbers are checked to connect a video communication even if there is no response.

When the H.324M mobile station 101 makes the SMS or MMS call, it corresponds to the originating side, and the H.324M mobile station 103 corresponds to the receiving side.

After the H.324M mobile station 103 checks the telephone number used for the SMS or MMS call and calls back the H.324M mobile station 101, the H.324M mobile station 101 becomes the receiving side, and the H.324M mobile station 103 becomes the originating side.

When the H.324M mobile station 103 calls the H.324M mobile station 101 using the stored telephone number in step 511, the H.324M mobile station 101 checks if the telephone number stored during the call is identical to the telephone number of the calling party in step 515. If the telephone numbers are the same, video communication is connected even if there is no response.

Now, the procedure will be described in more detail with reference to FIG. 5. When the H.324M mobile station 101 receives an input for a call in step 504, it checks if the call is an emergency call in step 505. If it is confirmed in step 505 that the call is not an emergency call, a normal call proceeding is conducted. If it is determined in step 505 that the call is an emergency call, it is checked in step 506 if the originating H.324M mobile station 101 is in an automatic emergency response mode. If it is confirmed in step 506 that the originating H.324M mobile station 101 is not in the automatic emergency response mode, the mode is selected and followed by a call proceeding. If it is confirmed in step 506 that the originating H.324M mobile station 101 is in the automatic emergency response mode, a setup is made in step 302 so that a call is made. When the H.324M mobile station 101 calls the H.324M mobile station 103, the telephone number of the originating side is stored in step 510. When the originating H.324M mobile station 101 makes a call using an SMS or MMS in step 507, the telephone number used for the SMS or MMS call is stored in step 509. The telephone number stored in this regard may be the number of an emergency center or a predetermined person. The receiving H.324M mobile station 103 checks the call number stored in step 510 and makes a call in step 511. In this case, the H.324M mobile station 103 switches from the receiving side to the originating side. This is similar to a case in which the H.324M mobile station 103 receives an SMS or MMD in absence. The H.324M mobile station 103 decides whether or not to make a call based on the contents of the SMS or MMS. When a call is necessary, the H.324M mobile station 103 becomes the originating side, and the H.324M mobile station 101 becomes the receiving side.

When the H.324M mobile station 103 makes a call in step 511, the receiving H.324M mobile station 101 checks in step 515 if the telephone number in step 509 is identical to the telephone number of the H.324M mobile station 103 which has made a call in step 511. If the telephone numbers are the same, a video communication is connected regardless of the response. When a predetermined person is called using an SMS or MMS, the telephone number used for the call is stored and compared with that of a later call. If the numbers are the same, a connection is made regardless of the response.

Some inconveniences may occur when the automatic emergency response mode is continuously selected even when the user is not in an emergency, because every call may be regarded as an emergency call. Therefore, an input for deselecting the automatic emergency response mode is monitored in step 520 after the emergency video communication is over. If an input is made, the mode is deselected in step 521 and, if not, the previous condition is maintained in step 522.

As apparent from the above description, the present invention is advantageous in that, depending on whether or not an automatic emergency response mode has been selected, a mobile station of a user in an emergency is connected to another mobile station of a remote person regardless of the response, or the latter mobile station calls the former mobile station and connects real-time video communications between them, even if there is no response. This can guarantee a proper emergency aid.

While exemplary embodiments of the present invention have been shown and described in this specification, it will be understood by those skilled in the art that various changes or modifications of the embodiments are possible without departing from the spirit and scope of the invention as defined by the appended claims. Particularly, although it has been assumed in the above description that only one of the originating and receiving sides is in an automatic emergency response mode, both of them may be in that mode. In addition, the mobile station can access a remote mobile station via the GGSN 17 and Internet 18 in an emergency. After the access, a video communication reflecting the emergency according to the teachings of the present invention becomes possible.

What is claimed is:

1. A method for automatically establishing a video communication between mobile stations in an emergency, the method comprising the steps of:
   (a) making an emergency call from a first mobile station to a second mobile station, the first mobile station being in an emergency;
   (b) confirming whether or not the first mobile station is in an automatic emergency response mode when the emergency call is made in the step (a);
   (c) conducting a call process between the first and second mobile stations when it has been confirmed in the step (b) that the first mobile station is in the automatic emergency response mode;
   (d) storing a telephone number of the second mobile station in the first mobile station, the second mobile station having been called in the step (c);
   (e) storing a telephone number of the first mobile station in the second mobile station, the first mobile station having made a call in the step (c);
   (f) making a call from the second mobile station to the first mobile station using the telephone number stored in the step (e);
   (g) determining whether or not the telephone number of the second mobile station is identical to the telephone number stored in the step (d), the second mobile station having made the call in the step (f); and
   (h) establishing the video communication between the first and second mobile stations regardless of a response from the first mobile station when it has been determined in the step (g) that the telephone numbers are identical.

2. The method as claimed in claim 1, wherein, in the step (a), an SMS or MMS is used to make the emergency call.

3. The method as claimed in claim 1, further comprising a step of deselecting the automatic emergency response mode according to a user' choice after the step (h), the automatic emergency response mode having been confirmed in the step (b).

4. A method for automatically establishing a video communication between mobile stations in an emergency, the method comprising the steps of:

selecting an automatic emergency response mode so that a first mobile station, the first mobile station being in an emergency, calls a second mobile station and automatically connects to the second mobile station;

making an emergency call from the first mobile station to the second mobile station according to the selected automatic emergency response mode;

establishing the video communication between the first and second mobile stations even when the second mobile station does not respond to the emergency call; and deselecting or maintaining the automatic emergency response mode after the video communication;

making an emergency call from the first mobile station to the second mobile station while the first mobile station is in the automatic emergency response mode and storing a call number used to make the call;

storing a telephone number of the first mobile station in the second mobile station, the first mobile station having made the call;

calling the first mobile station using the telephone number stored in the second mobile station; and determining whether or not the telephone number stored when the first mobile station calls the second mobile station is identical to the telephone number stored when the second mobile station calls the first mobile station and, when the telephone numbers are identical, automatically connecting the first and second mobile stations to each other regardless of a response from the first mobile station according to whether or not the first mobile station is in the automatic emergency response mode.

5. The method as claimed in claim 4, further comprising a step of automatically connecting the first and second mobile stations to each other regardless of a response from the first mobile station when the second mobile station calls the first mobile station while the first mobile station is in the automatic emergency response mode.

6. The method as claimed in claim 4, wherein an SMS or MMS is used to make the emergency call.

7. The method as claimed in claim 4, wherein the first or second mobile station is adapted to conduct a call process based on H.324M.

8. The method as claimed in claim 4, further comprising a step of accessing a remote mobile station via Internet based on H.324M when the first mobile station is in the automatic emergency response mode.

* * * * *